United States Patent
Wen et al.

(10) Patent No.: US 12,436,868 B2
(45) Date of Patent: Oct. 7, 2025

(54) CODE INSPECTION METHOD UNDER WEAK MEMORY ORDERING ARCHITECTURE AND CORRESPONDING DEVICE

(71) Applicant: HUAWEI TECHNOLOGIES CO., LTD., Guangdong (CN)

(72) Inventors: Yuzhong Wen, Hangzhou (CN); Jonas Oberhauser, Dresden (DE); Diogo Behrens, Dresden (DE); Ming Fu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 18/484,641

(22) Filed: Oct. 11, 2023

(65) Prior Publication Data

US 2024/0045787 A1 Feb. 8, 2024

Related U.S. Application Data

(63) Continuation of application No. PCT/CN2022/086590, filed on Apr. 13, 2022.

(30) Foreign Application Priority Data

Apr. 14, 2021 (CN) .......................... 202110401685.0

(51) Int. Cl.
    *G06F 11/3604* (2025.01)
(52) U.S. Cl.
    CPC .................. *G06F 11/3612* (2013.01)
(58) Field of Classification Search
    None
    See application file for complete search history.

(56) References Cited

U.S. PATENT DOCUMENTS

| 7,496,918 B1 | 2/2009 | Dice et al. |
|---|---|---|
| 2008/0288834 A1 | 11/2008 | Manovit et al. |

(Continued)

FOREIGN PATENT DOCUMENTS

| CN | 101833440 A | 9/2010 |
|---|---|---|
| CN | 104572451 A | 4/2015 |

(Continued)

OTHER PUBLICATIONS

A. Jannesari, Kaibin Bao, V. Pankratius and W. F. Tichy, "Helgrind+: An efficient dynamic race detector," 2009 IEEE International Symposium on Parallel & Distributed Processing, Rome, Italy, 2009, pp. 1-13. (Year: 2009).*

(Continued)

*Primary Examiner* — Andrew M. Lyons
(74) *Attorney, Agent, or Firm* — WOMBLE BOND DICKINSON (US) LLP

(57) ABSTRACT

This application discloses a code inspection method, including: obtaining first source code and test code, where the first source code includes a blocking mark, the first source code corresponds to a plurality of threads, the plurality of threads have at least one shared memory; generating, based on the first source code and the condition indicated by the test code, a plurality of execution flows under the weak memory ordering architecture for the plurality of threads that operate a same shared memory, where a busy-wait loop exists in a target execution flow that includes the blocking mark and that is in the plurality of execution flows; and determining the busy-wait loop in the target execution flow as an infinite loop if a read operation executed by a target thread in one iteration of the busy-wait loop cannot reference an unreferenced write operation.

16 Claims, 9 Drawing Sheets

(56) References Cited

U.S. PATENT DOCUMENTS

| | | | |
|---|---|---|---|
| 2009/0328045 A1 | 12/2009 | Burckhardt et al. | |
| 2010/0251031 A1* | 9/2010 | Nieh | G06F 11/3476 714/45 |
| 2011/0078666 A1* | 3/2011 | Altekar | G06F 11/3636 717/131 |
| 2012/0096441 A1* | 4/2012 | Law | G06F 11/3644 717/127 |
| 2018/0032423 A1* | 2/2018 | Bull | G06F 11/3636 |
| 2018/0173612 A1* | 6/2018 | Law | G06F 11/3636 |
| 2019/0196810 A1 | 6/2019 | Coldiron, Sr. | |
| 2021/0374037 A1* | 12/2021 | Grimwood | G06F 11/3636 |
| 2024/0045787 A1 | 2/2024 | Wen et al. | |

FOREIGN PATENT DOCUMENTS

| | | |
|---|---|---|
| CN | 106250316 A | 12/2016 |
| CN | 106940654 A | 7/2017 |
| CN | 109960643 A | 7/2019 |
| CN | 110083445 A | 8/2019 |
| CN | 110928778 A | 3/2020 |
| CN | 110941553 A | 3/2020 |
| CN | 111045832 A | 4/2020 |
| CN | 112905372 A | 6/2021 |
| CN | 114518884 A | 5/2022 |

OTHER PUBLICATIONS

Michalis Kokologiannakis et al., "Effective Stateless Model Checking for C/C++ Concurrency," Publication date: Jan. 2018, total: 32pages.

Jonas Oberhauser et al: VSync: Push-Button Verification and Optimization for Synchronization Primitives on Weak Memory Models. Apr. 17, 2021, total 16 pages.

Arun Kejariwal et al: "Lightweight lock-free synchronization methods for multithreading", ICS 06: 2006 International Conference on Supercomputing: Jun. 28-Jul. 1. Cairnsqueensland, Australia, Association for Computing Machinery, New York, NY, Jun. 28, 2006 (Jun. 28, 2006) , pp. 361-371, XP058233231, total 11 pages.

Chen Tian et al: "Automated dynamic detection of busy-wait synchronizations", Software-Practice and Experience, Wiley and Sons, Bognor Regis. GB, vol. 39, No. 11, Aug. 10, 2009 (Aug. 10, 2009), pp. 947-972, XP007917794, total 26 pages.

* cited by examiner

```
spinlock_lock(lock)
{
    while (lock) {
        /* Spin and wait */
    }
    lock = 1;
} spinlock_unlock(lock)
{
    lock = 0;
}
```

FIG. 5A

```
spinlock_lock(lock)
{
    while (true) {
        if (lock == 0)
            break;
    }
    lock = 1;
} spinlock_unlock(lock)
{
    lock = 0;
}
```

FIG. 5B

CODE INSPECTION METHOD UNDER WEAK MEMORY ORDERING ARCHITECTURE AND CORRESPONDING DEVICE

CROSS-REFERENCE TO RELATED APPLICATIONS

This application is a continuation of International Application No. PCT/CN2022/086590, filed on Apr. 13, 2022, which claims priority to Chinese Patent Application No. 202110401685.0, filed on Apr. 14, 2021. The disclosures of the aforementioned applications are hereby incorporated by reference in their entireties.

TECHNICAL FIELD

This application relates to the field of computer technologies, and specifically, to a code inspection method under a weak memory ordering architecture and a corresponding device.

BACKGROUND

When a processor invokes a thread to operate a memory, in the case of a strong memory ordering architecture (such as an x86 architecture), an actual execution sequence is consistent with a code writing sequence, and the memory access sequence is not rearranged. However, under a weak memory ordering architecture (such as an advanced reduced instruction set computing machine (advanced RISC machine, ARM) architecture, a reduced instruction set computing five (RISC-V) architecture, a microprocessor without interlocked pipeline stages (MIPS) architecture, or a performance optimization with enhanced RISC (POWER) architecture), the processor usually rearranges the memory access sequence based on an execution status. The rearrangement may lead to inconsistency between the code sequence actually executed by the processor and the code writing sequence.

Under the weak memory ordering architecture, the code sequence actually executed by the processor for a memory may be inconsistent with the code writing sequence. Therefore, after code that is correctly executed under the strong memory ordering architecture is migrated to the weak memory ordering architecture, a problem occurs at a high probability, leading to unexpected behavior.

Currently, a model inspection technology is used to inspect a rearranged memory access execution flow under the weak memory ordering architecture, to find out whether same code has a behavior difference between the weak memory ordering architecture and the strong memory ordering architecture. However, because the current model inspection technology cannot be used to predict a quantity of execution times of a busy-wait loop in the rearranged code, when there is code with the busy-wait loop, an infinite quantity of execution flows are generated. Finding out whether the rearranged code has a problem among the infinite quantity of execution flows is obviously an impossible task.

SUMMARY

Embodiments of this application provide a code inspection method under a weak memory ordering architecture, to implement correctness inspection of busy-wait loop code under the weak memory ordering architecture. Embodiments of this application further provide a corresponding device, a computer-readable storage medium, a computer program product, and the like.

A first aspect of this application provides a code inspection method under a weak memory ordering architecture, including: obtaining first source code and test code, where the first source code includes a blocking mark, the test code indicates a condition that needs to be met for correct running of the first source code, the first source code corresponds to a plurality of threads, the plurality of threads have at least one shared memory, and the blocking mark indicates a location of a busy-wait loop in the first source code; generating, based on the first source code and the condition indicated by the test code, a plurality of execution flows under the weak memory ordering architecture for the plurality of threads that operate a same shared memory, where each execution flow is a code execution process in which a processor runs the plurality of threads to perform a read operation and/or write operation on the same shared memory, and a busy-wait loop exists in a target execution flow that includes the blocking mark and that is in the plurality of execution flows; and determining the busy-wait loop in the target execution flow as an infinite loop if a read operation executed by a target thread in one iteration of the busy-wait loop cannot reference an unreferenced write operation when the plurality of threads are invoked to execute the busy-wait loop in the target execution flow, where the infinite loop indicates that an error exists in the first source code, and the target thread is any one of the plurality of threads.

In an embodiment of this application, the code inspection method is applied to a computer device, and the computer device may be a server, a terminal device, or a virtual machine (VM). The weak memory ordering architecture is a concept relative to a strong memory ordering architecture. Both the weak memory ordering architecture and the strong memory ordering architecture are instruction set architectures. The strong memory ordering architecture may include an x86 architecture, and the weak memory ordering architecture may include an advanced reduced instruction set (ARM) architecture. Under the strong memory ordering architecture, a code sequence actually executed by the processor when the processor invokes a thread to operate a memory may keep consistent with a code writing sequence. However, under the weak memory ordering architecture, a code sequence actually executed by the processor when the processor invokes a thread to operate a memory may be inconsistent with the code writing sequence.

In an embodiment of this application, the first source code is usually a multithread synchronization algorithm with busy-wait semantics, such as a spin lock or a lock-free list. The blocking mark in the first source code may be manually added, or may be added by the computer device when the computer device preprocesses source code that is initially obtained and that has no blocking mark. The test code defines correctness of the first source code, and the test code may provide a condition that needs to be met for correctness of the first source code. For example, the test code may provide a condition that needs to be met for exiting a loop.

In an embodiment of this application, that the first source code corresponds to a plurality of threads means that the first source code may be invoked by the plurality of threads to execute an operation on the memory. There may be a plurality of shared memories, and each shared memory has a memory address. Different shared memories have different memory addresses. When the plurality of threads operate a same shared memory, a busy-wait loop may exist. The busy-wait loop means that when a thread operates a shared memory, the thread is in a waiting state because another thread occupies the processor. The busy-wait loop is exited after a loop condition of the busy-wait loop reaches a corresponding value. In an embodiment of this application, the busy-wait loop is a code block, and code in the code block indicates a process of the busy-wait loop.

In an embodiment of this application, that a thread operates a shared memory may include: The thread executes a read operation and/or write operation on the shared memory. The "read operation and/or write operation" indicates executing the read operation only, executing the write operation only, or executing both the read operation and the write operation. Generally, when the plurality of threads operate the shared memory, both the read operation and the write operation need to be executed. For example, a thread 1 executes a read operation, and a thread 2 executes a write operation.

In an embodiment of this application, an execution flow is an actual execution process of code for executing the read operation and/or the write operation on the same shared memory by the plurality of threads. Different execution flows may be determined based on operation sequences of the plurality of threads on the same memory. For example, three threads operate a same shared memory, and there may be six execution flows based on execution sequences of the three threads. A busy-wait loop exists in the target execution flow, the busy-wait loop includes a blocking mark, and a quantity of target execution flows is not limited to one. Each execution flow in the plurality of execution flows may be the target execution flow. An execution flow including a blocking mark may be understood as a target execution flow.

In an embodiment of this application, the target execution flow including the blocking mark is inspected. Because the busy-wait loop exists in the target execution flow, code of the busy-wait loop may be executed for a plurality of times in a process of executing the target execution flow. A process of each iteration of the busy-wait loop relates to a read operation, and usually, a newly generated read operation corresponds to a new write operation. A newly generated read operation corresponding to a write operation that has been referenced by another read operation is considered as a meaningless loop. Therefore, when the newly generated read operation cannot reference a new write operation, namely, a write operation that is not referenced, it indicates that a busy-wait loop of the target execution flow cannot be exited and is an infinite loop. In this case, it indicates that an error exists in the first source code and the first source code cannot be normally executed. It can be learned from the foregoing content that, in the first aspect, because the target execution flow may be inspected by using the blocking mark, even if the first source code may generate an infinite quantity of execution flows, there is no need to inspect all the execution flows. Therefore, in the solution provided in the first aspect, correctness inspection of the first source code can be completed within a limited time.

In an embodiment, the foregoing operation of obtaining first source code includes: obtaining second source code; and identifying, from the second source code, a code block that indicates the busy-wait loop, and adding the blocking mark to the code block that indicates the busy-wait loop, to obtain the first source code.

In this embodiment, the second source code that does not include the blocking mark may be identified, and the blocking mark is added, to help implement correctness inspection of source code can be implemented in a subsequent code inspection process.

In an embodiment, the method further includes: converting, from a first form to a second form, a symbol indicating a loop condition in the code block that indicates the busy-wait loop. The foregoing operation of adding the blocking mark to the code block that indicates the busy-wait loop includes: adding the blocking mark to a location associated with the symbol of the loop condition in the second form.

In this embodiment, the loop condition (loop-condition) indicates a loop end condition. For example, while (lock) indicates a loop condition, where "while" indicates a symbol of the loop condition. Converting the symbol of the loop condition from the first form to the second form may be converting "while" in the first form to "if" in the second form. Certainly, this application is not limited to a content in the first form and in the second form, provided that the symbol in the first form may indicate the loop condition and the symbol in the second form may be detected to indicate a loop. The blocking mark may be a blocking primitive, such as modelchecker_block. In an embodiment of this application, the blocking mark may be added to follow the loop condition. Certainly, In an embodiment of this application, a specific location to which the blocking mark is added is not limited, provided that it is a location associated with the symbol of the loop condition in the second form. This embodiment helps quickly inspect a busy-wait loop, thereby improving a speed of code correctness inspection.

In an embodiment, the foregoing operation of identifying, from the second source code, a code block that indicates the busy-wait loop includes: identifying a loop condition from the second source code, where the loop condition includes always true or not always true; and if the loop condition is not always true, determining, based on a value corresponding to the loop condition, that a code block associated with the loop condition is the code block of the busy-wait loop; or if the loop condition is always true, determining, based on a loop body associated with the loop condition, that a code block associated with the loop condition is the code block of the busy-wait loop.

In this embodiment, the loop condition usually includes: always true or not always true. If the loop condition is not always true, the loop condition is usually whether a value read through a read operation on an atomic variable or an atom read-swap (compare and swap) operation meets a loop exit. The loop condition is determined based on a condition whether the value read through the read operation on the atomic variable meets the loop exit. If the loop condition is always true, an exit condition needs to be defined through the loop body (loop-body), to determine a loop condition in the code. This embodiment helps quickly determine a loop condition, to quickly identify a code block of a busy-wait loop in source code.

In an embodiment, the method further includes: filtering out a redundant execution flow from the plurality of execution flows, where at least two write operations in at least two iterations of a loop in the redundant execution flow correspond to a same write operation.

In this embodiment, after the plurality of execution flows are determined, the redundant execution flow thereof may be filtered out. In this way, an inspection range of an execution flow can be reduced, to shorten a time for inspecting source code.

In an embodiment, the foregoing operation of filtering out a redundant execution flow from the plurality of execution flows includes: inspecting a first read operation in a current iteration of a loop in a first execution flow, where the first execution flow is any execution flow in the plurality of execution flows, and the current iteration of the loop is one iteration, being executed in the first execution flow, of the busy-wait loop; if a current thread that executes the first read operation is executing a busy-wait loop in the first execution flow, inspecting a write operation corresponding to the first read operation; if a write operation referenced by the current thread that executes the first read operation has been referenced by the current thread when previously executing a second read operation in a loop, determining that the first execution flow is the redundant execution flow; and filtering out the first execution flow.

In this embodiment, a process of determining the redundant execution flow may be performed by inspecting whether the read operation has a corresponding unreferenced write operation. If one write operation is referenced twice by two write operations executed by a thread that does not belong to a same iteration of a busy-wait loop, it indicates that the executed first execution flow is a redundant execution flow, and the first execution flow needs to be filtered out. This solution of filtering out a redundant execution flow can accelerate reduction of an inspection range of an execution flow.

In an embodiment, the foregoing operation of determining the busy-wait loop in the target execution flow as an infinite loop if a read operation executed by a target thread in one iteration of the busy-wait loop cannot reference an unreferenced write operation when the plurality of threads are invoked to execute the busy-wait loop in the target execution flow includes: when the plurality of threads are invoked to execute the busy-wait loop in the target execution flow, setting a state mark for each read operation in a state set; when one write operation is generated in the busy-wait loop, deleting one state mark from the state set; and when the write operation is no longer generated in the busy-wait loop, if the state set still includes the state mark, determining the busy-wait loop in the target execution flow as the infinite loop.

In this embodiment, whether each newly generated read operation has a newly generated write operation may be determined by using the state mark. If there is a state mark left in the state set, it indicates that the newly generated read operation has no corresponding newly generated write operation. In this case, it indicates that the busy-wait loop cannot be exited, and the busy-wait loop is an infinite loop. This implementation helps quickly determine whether a busy-wait loop can be terminated. If the busy-wait loop cannot be terminated, it indicates that an error exists in the first source code.

A second aspect of this application provides a code inspection apparatus under a weak memory ordering architecture, including:

an obtaining unit, configured to obtain first source code and test code, where the first source code includes a blocking mark, the test code indicates a condition that needs to be met for correct running of the first source code, the first source code corresponds to a plurality of threads, the plurality of threads have at least one shared memory, and the blocking mark indicates a location of a busy-wait loop in the first source code;

a first processing unit, configured to generate, based on the first source code and the condition indicated by the test code, a plurality of execution flows under the weak memory ordering architecture for the plurality of threads that operates a same shared memory, where each execution flow is a code execution process in which a processor runs the plurality of threads to perform a read operation and/or write operation on the same shared memory, and a busy-wait loop exists in a target execution flow that includes the blocking mark and that is in the plurality of execution flows; and a second processing unit, configured to determine the busy-wait loop in the target execution flow as an infinite loop if a read operation executed by a target thread in one iteration of the busy-wait loop cannot reference an unreferenced write operation when the plurality of threads are invoked to execute the busy-wait loop in the target execution flow generated by the first processing unit, where the infinite loop indicates that an error exists in the first source code, and the target thread is any one of the plurality of threads.

In an embodiment, the obtaining unit is configured to: obtain second source code; and identify, from the second source code, a code block that indicates the busy-wait loop, and add the blocking mark to the code block that indicates the busy-wait loop, to obtain the first source code.

In an embodiment, the first processing unit is further configured to: convert, from a first form to a second form, a symbol indicating a loop condition in the code block that indicates the busy-wait loop; and add the blocking mark to a location associated with the symbol of the loop condition in the second form.

In an embodiment, the first processing unit is configured to: identify a loop condition from the second source code, where the loop condition includes always true or not always true; if the loop condition is not always true, determine, based on a value corresponding to the loop condition, that a code block associated with the loop condition is the code block of the busy-wait loop; or if the loop condition is always true, determine, based on a loop body associated with the loop condition, that a code block associated with the loop condition is the code block of the busy-wait loop.

In an embodiment, the first processing unit is further configured to filter out a redundant execution flow from the plurality of execution flows, where at least two write operations in at least two iterations of a loop in the redundant execution flow correspond to a same write operation.

In an embodiment, the first processing unit is configured to: inspect a first read operation in a current iteration of a loop in a first execution flow, where the first execution flow is any execution flow in the plurality of execution flows, and the current iteration of the loop is one iteration, being executed in the first execution flow, of the busy-wait loop; if a current thread that executes the first read operation is executing a busy-wait loop in the first execution flow, inspect a write operation corresponding to the first read operation; if a write operation referenced by the current thread that executes the first read operation has been referenced by the current thread when previously executing a second read operation in a loop, determine that the first execution flow is the redundant execution flow; and filter out the first execution flow.

In an embodiment, the second processing unit is configured to: when the plurality of threads are invoked to execute the busy-wait loop in the target execution flow, set a state mark for each read operation in a state set; when one write operation is generated in the busy-wait loop, delete one state mark from the state set; and when the write operation is no longer generated in the busy-wait loop, if the state set further includes the state mark, determine the busy-wait loop in the target execution flow as the infinite loop.

A third aspect of this application provides a computer device. The computer device includes a processor, a memory, and a computer-readable storage medium storing a computer program. The processor is coupled to the computer-readable storage medium, and the processor runs computer-executable instructions. When the computer execution instructions are executed by the processor, the processor performs the method according to any one of the first aspect or the possible implementations of the first aspect. In an embodiment, the computer device may further include an input/output (input/output, I/O) interface, and the computer-readable storage medium storing the computer program may be a memory.

A fourth aspect of this application provides a computer-readable storage medium storing one or more computer-executable instructions. When the computer-executable instructions are executed by a processor, the processor performs the method according to any one of the first aspect or the possible implementations of the first aspect.

A fifth aspect of this application provides a computer program product storing one or more computer-executable instructions. When the computer-executable instructions are executed by a processor, the processor performs the method according to any one of the first aspect or the possible implementations of the first aspect.

A sixth aspect of this application provides a chip system. The chip system includes at least one processor, and the at least one processor is configured to support a memory management apparatus to implement the functions in any one of the first aspect or the possible implementations of the first aspect. In a possible design, the chip system may further include a memory. The memory is configured to store program instructions and data that are necessary for the memory management apparatus. The chip system may include a chip, or may include a chip and another discrete component.

For technical effects brought by any one of the second aspect to the sixth aspect or any possible implementation thereof, refer to technical effects brought by the first aspect or different possible implementations of the first aspect. Details are not described herein again.

According to the solutions provided in embodiments of this application, because the target execution flow may be inspected by using the blocking mark, even if the first source code may generate an infinite quantity of execution flows, there is no need to inspect all the execution flows. Therefore, correctness inspection of the first source code can be completed within a limited time.

BRIEF DESCRIPTION OF DRAWINGS

FIG. 5A is a schematic diagram of an example of spin lock code according to an embodiment of this application;
FIG. 5B is a schematic diagram of an example of spin lock variant code according to an embodiment of this application.

DESCRIPTION OF EMBODIMENTS

Figure 1A:
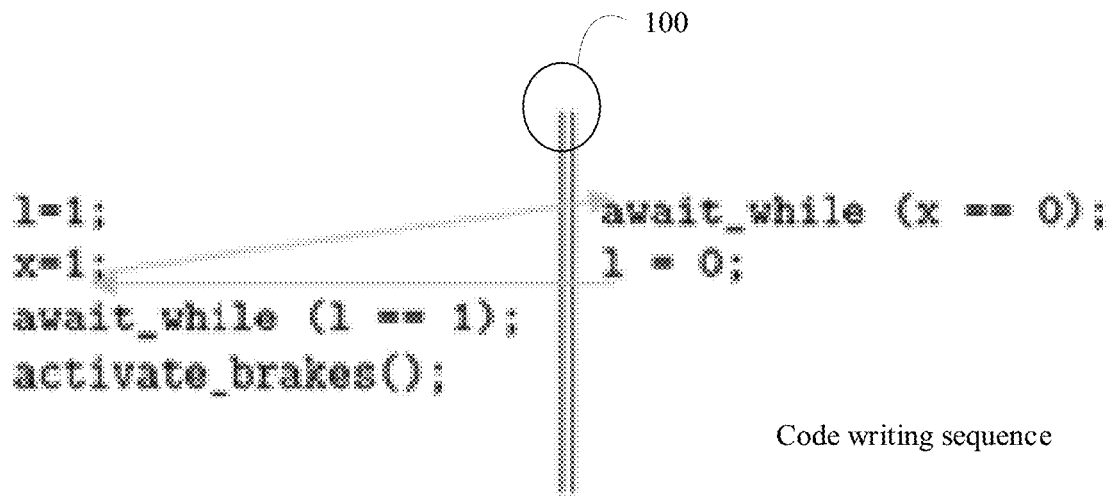
FIG. 1A is an example diagram of a code block.

The following describes embodiments of this application with reference to accompanying drawings. It is clear that the described embodiments are merely some but not all of embodiments of this application. A person of ordinary skill in the art may learn that, with technology development and emergence of a new scenario, the technical solutions provided in embodiments of this application are also applicable to a similar technical problem.

In the specification, claims, and accompanying drawings of this application, the terms "first", "second", and the like are intended to distinguish between similar objects but do not necessarily indicate a specific ordering or sequence. It should be understood that the terms used in such a way are interchangeable in proper circumstances so that the embodiments described herein can be implemented in orderings other than the ordering illustrated or described herein. In addition, the terms "include", "have" and any other variants mean to cover a non-exclusive inclusion. For example, a process, method, system, product, or device that includes a series of operations or units is not necessarily limited to those operations or units that are expressly listed, but may include other operations or units not expressly listed or are inherent to the process, method, product, or device.

Embodiments of this application provide a code inspection method under a weak memory ordering architecture, to implement correctness inspection of busy-wait loop code under the weak memory ordering architecture. Embodiments of this application further provide a corresponding device, a computer-readable storage medium, a computer program product, and the like. Details are separately described below.

In embodiments of this application, the weak memory ordering architecture is a concept relative to a strong memory ordering architecture. Both the weak memory ordering architecture and the strong memory ordering architecture are instruction set architectures. The strong memory ordering architecture may include an x86 architecture. The weak memory ordering architecture may include an advanced reduced instruction set (ARM) architecture, a fifth generation instruction architecture based on a reduced instruction set (RISC-V), a microprocessor architecture without interlocked pipeline (MIPS), or an instruction set system architecture based on a reduced instruction set architecture (POWER). Under the strong memory ordering architecture, a code sequence actually executed by a processor when the processor invokes a thread to operate a memory may keep consistent with a code writing sequence. However, under the weak memory ordering architecture, a code sequence actually executed by the processor when the processor invokes a thread to operate a memory may be inconsistent with a code writing sequence.

In actual application, code under the strong memory ordering architecture may be usually migrated to the weak memory ordering architecture to be run. For example, when a service is migrated from the x86 architecture to the ARM architecture, code that is run normally under the x86 strong memory ordering architecture may hang or have a deadlock under the ARM weak memory ordering architecture.

Figure 1B:
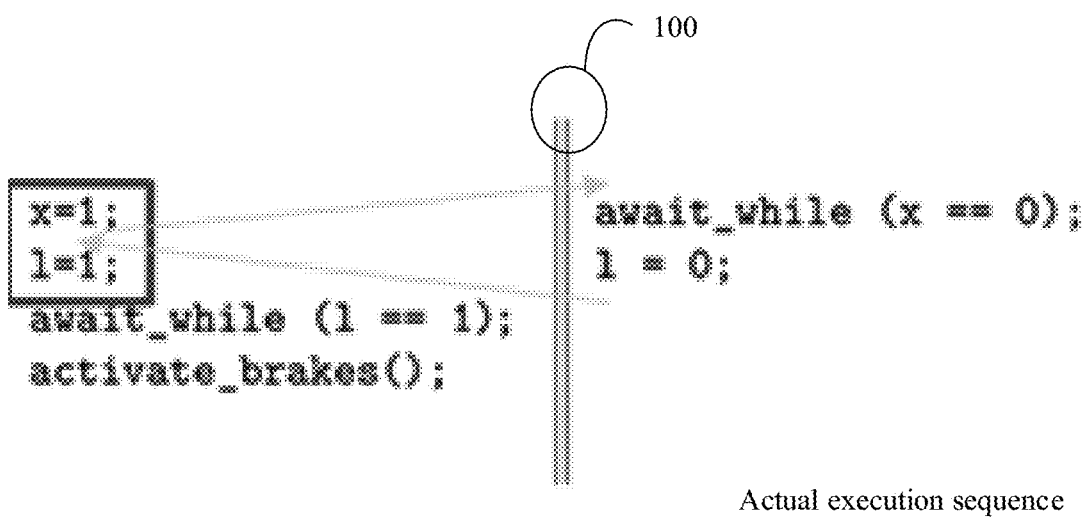
FIG. 1B is an example diagram of another code block.

A code block shown in FIG. 1A shows a code writing sequence, and a code block shown in FIG. 1B shows an actual execution sequence. Under a strong memory ordering architecture, the sequence shown in FIG. 1A. is executed, and code on two sides of vertical lines 100 respectively represents code in two different threads. In an actual writing sequence, in code on the left of the vertical lines 100, because x is assigned with a value of 1 after 1, after an await_while loop of a thread on the right of the vertical lines 100 is exited, 1 is definitely assigned with a value of 0, and 1 is not equal to 1. Therefore, await_while of a thread on the left of the vertical lines 100 can be definitely exited successfully. After the code shown in FIG. 1A is migrated to a weak memory ordering architecture, the code may be rearranged, a process shown in FIG. 1B may be executed, and x may be assigned before 1. In this case, after the thread on the right of the vertical lines 100 executes l=0, it is possible that the thread on the left of the vertical lines 100 executes l=1. Because l=1, it may cause the await_while loop to continue to run, and finally cause the await_while loop on the left of the vertical lines 100 to fail to be exited, and the program hangs.

Therefore, to avoid a problem of a program hang or a deadlock during code running, before source code is actually run under the weak memory ordering architecture, the source code needs to be inspected under the weak memory ordering architecture. If a problem is detected, it indicates that an error exists in the source code and the source code needs to be modified. The solution provided in embodiments of this application is a solution for inspecting source code that is run under the weak memory ordering architecture.

The code inspection method under the weak memory ordering architecture provided in embodiments of this application is applied to a computer system. The computer system may be a server, a terminal device, a virtual machine (VM), or a container.

The server may be a physical machine in any form.

The terminal device (which may also be referred to as user equipment (UE)) is a device that has a wireless transceiver function, and may be deployed on land, including an indoor or outdoor device, a handheld device, or a vehicle-mounted device, may be deployed on water (for example, on a ship), or may be deployed in the air (for example, on an airplane, a balloon, a satellite, and the like). The terminal device may be a personal computer (PC), a mobile phone, a tablet computer (pad), a computer having a wireless transceiver function, a virtual reality (VR) terminal, an augmented reality (augmented reality, AR) terminal, a wireless terminal in industrial control (industrial control), a wireless terminal in self driving, a wireless terminal in remote medical (remote medical), a wireless terminal in a smart grid, a wireless terminal in transportation safety, a wireless terminal in a smart city, a wireless terminal in a smart home (smart home), a wireless terminal in internet of things (IoT), or the like.

The virtual machine may be located in a cloud or may be located locally.

Figure 2:
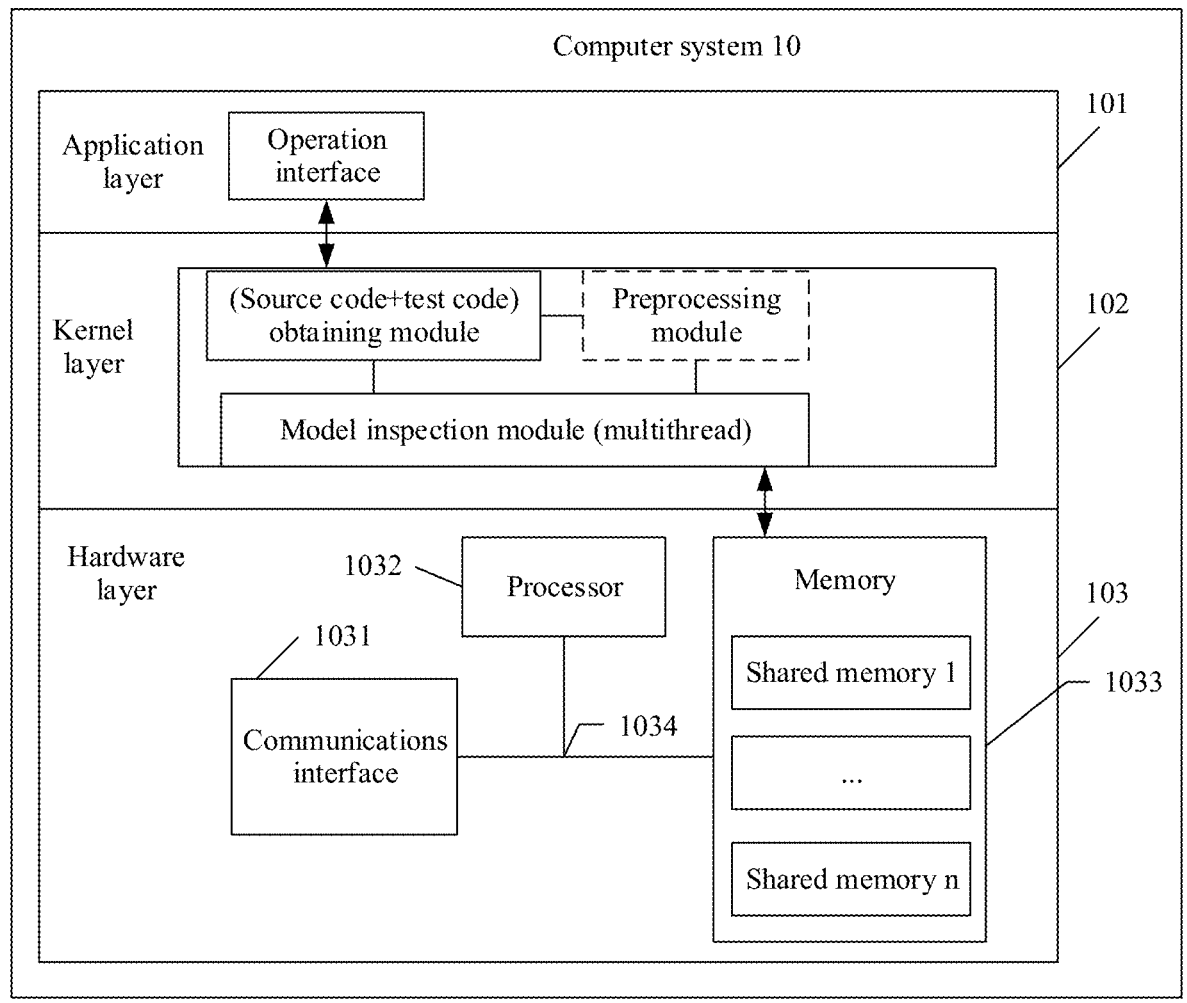
FIG. 2 is a schematic diagram of an architecture of a computer system according to an embodiment of this application.

For an architecture of the computer system provided in embodiments of this application, refer to FIG. 2 for understanding.

FIG. 2 is a schematic diagram of an architecture of a computer system according to an embodiment of this application.

As shown in FIG. 2, an architecture of a computer system 10 may include an application layer 101, a kernel layer 102, and a hardware layer 103.

The application layer 101 includes an operation interface, and program inspection staff may start a source code inspection process by using the operation interface.

The kernel layer 102 includes an obtaining module. The obtaining module is configured to obtain source code and test code. The kernel layer 102 further includes a model inspection module, and may further include a preprocessing module.

The preprocessing module is configured to add a blocking mark to source code having no added blocking mark.

The model inspection module is configured to inspect correctness of source code including the blocking mark when a plurality of threads execute the source code to access a same shared memory.

The hardware layer 103 includes a communications interface 1031, a processor 1032, a memory 1033, a bus 1034, and the like. The communications interface 1031, the processor 1032, and the memory 1033 are connected through the bus 1034. The processor 1032 may include any type of general-purpose computing circuit or application-specific logic circuit, such as a field-programmable gate array (FPGA) or an application specific integrated circuit (ASIC). The processor 1032 may also be one or more processors coupled to one or more semiconductor substrates, such as a central processing unit (CPU). A memory may include a plurality of shared memories, such as a shared memory 1 to a shared memory n shown in FIG. 2. Each shared memory is a storage area in the memory. Each shared memory has a memory address, and different shared memories have different memory addresses.

In this embodiment of this application, the processor may run a plurality of threads to execute an execution flow generated based on the source code and the test code, operate a same shared memory, and inspect whether a busy-wait loop in an execution flow including a blocking mark is an infinite loop, to determine whether an error exists in the source code. Because the target execution flow may be inspected by using the blocking mark, even if the source code may generate an infinite quantity of execution flows, there is no need to inspect all the execution flows. Therefore, correctness inspection of the source code can be completed within a limited time.

It can be learned from the foregoing part of content in FIG. 2 that the solutions provided in embodiments of this application include: (1) a solution in which a model inspection module directly executes code inspection of source code without using a preprocessing module; and (2) a solution in which a model inspection module executes code inspection on source code after the source code is preprocessed by using a preprocessing module. The following is separately introduced by using a computer device as an execution subject.

Figure 3:
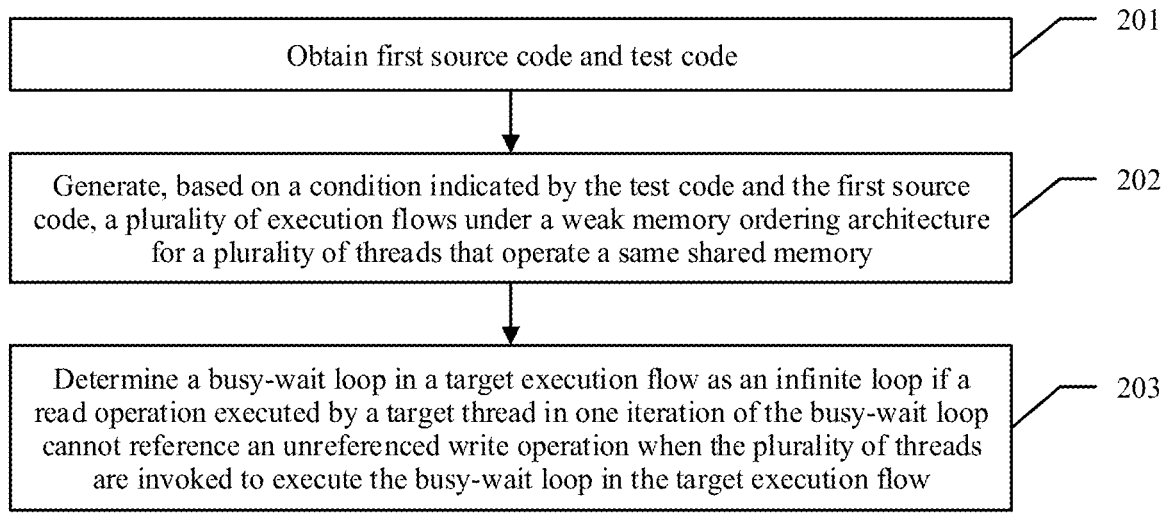
FIG. 3 is a schematic diagram of an embodiment of a code inspection method under a weak memory ordering architecture according to an embodiment of this application.

(1) Solution in which a Model Inspection Module Directly Executes Code Inspection on Source Code without Using a Preprocessing Module As shown in FIG. 3, an embodiment of a code inspection method under a weak memory ordering architecture provided in an embodiment of this application includes the following operations.

Operation 201: Obtain first source code and test code.

The first source code includes a blocking mark, the test code indicates a condition that needs to be met for correct running of the first source code, the first source code corresponds to a plurality of threads, the plurality of threads have at least one shared memory, and the blocking mark indicates a location of a busy-wait loop in the first source code.

In this embodiment of this application, the first source code is usually a multithread synchronization algorithm with busy-wait semantics, such as a spin lock or a lock-free list. The blocking mark in the first source code may be manually added. The test code defines correctness of the first source code, and the test code may provide a condition that needs to be met for correctness of the first source code. For example, the test code may provide a condition that needs to be met for exiting a loop.

In this embodiment of this application, that the first source code corresponds to a plurality of threads means that the first source code may be invoked by the plurality of threads to execute an operation on a shared memory. There may be a plurality of shared memories in a memory, and each shared memory has a memory address. Different shared memories have different memory addresses. When the plurality of threads operate a same shared memory, there may be a busy-wait loop. The busy-wait loop means that when a thread operates a shared memory, the thread is in a waiting state because another thread occupies the processor. The busy-wait loop is exited after a loop condition of the busy-wait loop reaches a corresponding value. In an embodiment of this application, the busy-wait loop is a code block, and code in the code block indicates a process of the busy-wait loop.

Operation 202: Generate, based on the first source code and the condition indicated by the test code, a plurality of execution flows under the weak memory ordering architecture for the plurality of threads that operate the same shared memory.

Each execution flow is a code execution process in which the processor runs the plurality of threads to perform a read operation and/or write operation on the same shared memory, and a busy-wait loop exists in a target execution flow that includes the blocking mark and that is in the plurality of execution flows.

In this embodiment of this application, that a thread operates a shared memory may include: The thread executes a read operation and/or write operation on the shared memory. The "read operation and/or write operation" indicates executing the read operation only, executing the write operation only, or executing both the read operation and the write operation. Generally, when the plurality of threads operate the shared memory, both the read operation and the write operation need to be executed. For example, a thread 1 executes a read operation, and a thread 2 executes a write operation.

In this embodiment of this application, the execution flow is an actual execution process of code for executing the read operation and/or write operation on the same shared memory by the plurality of threads. Different execution flows may be determined based on a sequence of operating the same memory by the plurality of threads. For example, three threads operate a same shared memory, and there may be six execution flows based on execution sequences of the three threads. A busy-wait loop exists in the target execution flow, the busy-wait loop includes a blocking mark, and a quantity of target execution flows is not limited to one. Each execution flow in the plurality of execution flows may be the target execution flow. An execution flow including a blocking mark may be understood as a target execution flow.

Operation 203: Determine the busy-wait loop in the target execution flow as an infinite loop if a read operation executed by a target thread in one iteration of the busy-wait loop cannot reference an unreferenced write operation when the plurality of threads are invoked to execute the busy-wait loop in the target execution flow.

The infinite loop indicates that an error exists in the first source code, and the target thread is any one of the plurality of threads.

In this embodiment of this application, the target execution flow including the blocking mark is inspected. Because the busy-wait loop exists in the target execution flow, code of the busy-wait loop may be executed for a plurality of times in a process of executing the target execution flow. A process of each iteration of the busy-wait loop relates to a read operation, and usually, a newly generated read operation corresponds to a new write operation. A newly generated read operation corresponding to a write operation that has been referenced by another read operation is considered as a meaningless loop. Therefore, when the newly generated read operation cannot reference a new write operation, namely, a write operation that is not referenced, it indicates that a busy-wait loop of the target execution flow cannot be exited and is an infinite loop. In this case, it indicates that an error exists in the first source code and the first source code cannot be normally executed.

According to the solution provided in this embodiment of this application, because the target execution flow may be inspected by using the blocking mark, even if the first source code may generate an infinite quantity of execution flows, there is no need to inspect all the execution flows. Therefore, correctness inspection of the first source code can be completed within a limited time.

Figure 4:
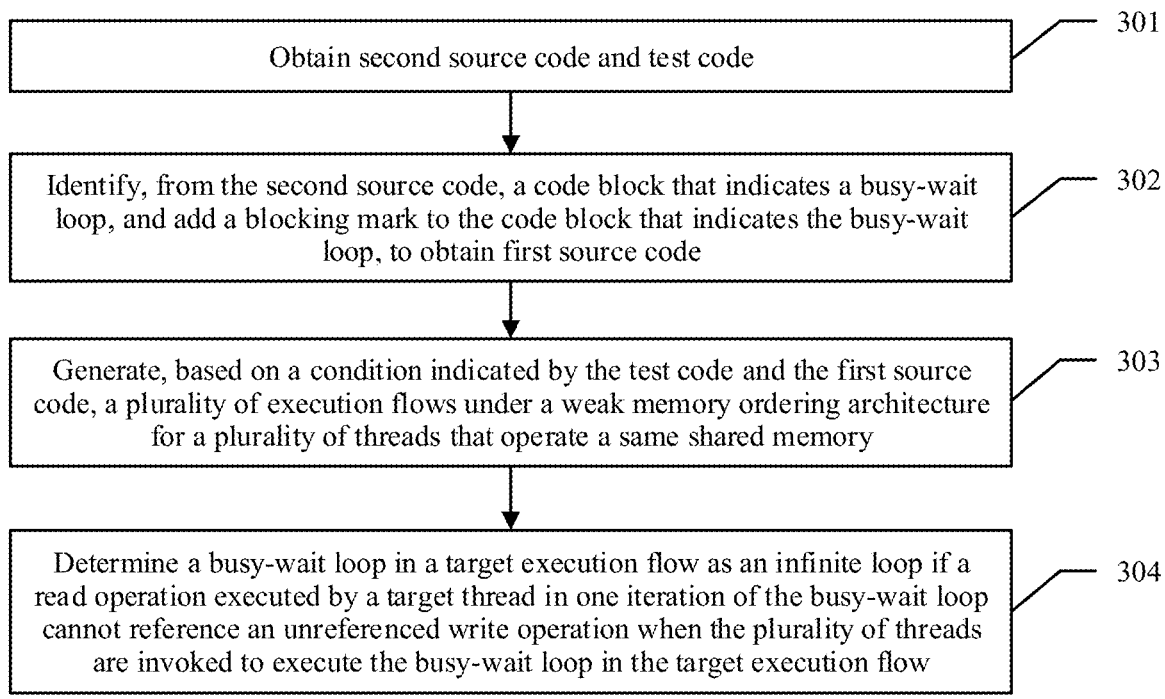
FIG. 4 is a schematic diagram of another embodiment of a code inspection method under a weak memory ordering architecture according to an embodiment of this application.

(2) Solution in which a Model Inspection Module Executes Code Inspection on Source Code after the Source Code is Preprocessed by Using a Preprocessing Module As shown in FIG. 4, another embodiment of a code inspection method under a weak memory ordering architecture provided in an embodiment of this application includes the following operations.

Operation 301: A computer device obtains second source code and test code.

The second source code is source code having no added blocking mark.

Operation 302: Identify, from the second source code, a code block that indicates a busy-wait loop, and add a blocking mark to the code block that indicates the busy-wait loop, to obtain first source code.

The preprocessing process may further convert, from a first form to a second form, a symbol indicating a loop condition in the code block that indicates the busy-wait loop; and add the blocking mark to a location associated with the symbol of the loop condition in the second form.

The loop condition (loop-condition) indicates a loop end condition. For example, while (lock) indicates a loop condition, where "while" indicates a symbol of the loop condition. Converting the symbol of the loop condition from the first form to the second form may be converting "while" in the first form to "if" in the second form. Certainly, this application is not limited to content in the first form and in the second form, provided that the symbol in the first form may indicate a loop condition and the symbol in the second form may be detected to indicate a loop. The blocking mark may be a blocking primitive, such as modelchecker_block. In some embodiments of this application, the blocking mark may be added to follow the loop condition. Certainly, in some embodiments of this application, a specific location to which the blocking mark is added is not limited, provided that it is a location associated with the symbol of the loop condition in the second form. This solution helps to quickly inspect a busy-wait loop, to improving a speed of code correctness inspection.

Operation 303: Generate, based on a condition indicated by the test code and the first source code, a plurality of execution flows under the weak memory ordering architecture for a plurality of threads that operate a same shared memory.

Each execution flow is a code execution process in which a processor runs the plurality of threads to perform a read operation and/or write operation on the same shared memory, and a busy-wait loop exists in a target execution flow that includes the blocking mark and that is in the plurality of execution flows.

Operation 304: Determine a busy-wait loop in the target execution flow as an infinite loop if a read operation executed by a target thread in one iteration of the busy-wait loop cannot reference an unreferenced write operation when the plurality of threads are invoked to execute the busy-wait loop in the target execution flow.

The infinite loop indicates that an error exists in the first source code, and the target thread is any one of the plurality of threads.

For understanding of operation 303 and operation 304, refer to the foregoing operations 202 and 203. Details are not described herein again.

According to the solution provided in this embodiment of this application, source code that does not include the blocking mark may be preprocessed, and is added with the blocking mark. In this way, the target execution flow may be inspected by using the blocking mark, and even if the first source code may generate an infinite quantity of execution flows, there is no need to inspect all the execution flows. Therefore, correctness inspection of the first source code can be completed within a limited time.

In an embodiment, in the foregoing operation 302, the identifying, from the second source code, a code block that indicates a busy-wait loop includes: identifying a loop condition from the second source code, where the loop condition includes always true or not always true; and if the loop condition is not always true, determining, based on a value corresponding to the loop condition, a code block associated with the loop condition as the code block of the busy-wait loop; or if the loop condition is always true, determining, based on a loop body associated with the loop condition, a code block associated with the loop condition as the code block of the busy-wait loop.

In this embodiment of this application, If the loop condition is not always true, the loop condition is usually whether a value read through a read operation on an atomic variable or an atom read-swap (compare and swap) operation meets a loop exit. The loop condition is determined based on a condition whether the value read through the read operation on an atomic variable meets a loop exit. If the loop condition is always true, an exit condition needs to be defined through the loop body (loop-body), to determine a loop condition in the code. This embodiment helps quickly determine a loop condition, thus quickly identifying a code block of a busy-wait loop in a source code.

In this embodiment of this application, for understanding of a case in which the loop condition is not always true, refer to FIG. 5A, which is a schematic diagram of an example of spin lock code. As shown in FIG. 5A, the example diagram includes 12 lines of code, and all lines of code are respectively marked with 1 to 12. In line 3, while (lock) is a loop condition. A value of lock is repeatedly checked in the loop to determine whether a thread invoking a spinlock_lock function continues with the loop from line 3 to line 6 or exits the loop to execute code after line 6.

In this embodiment of this application, for understanding of a case in which the loop condition is always true, refer to FIG. 5B, which is a schematic diagram of an example of spin lock code. As shown in FIG. 5B, the example diagram includes 13 lines of code, and all lines of code are respectively marked with 1 to 13. In line 3, while (true) indicates that the loop condition is always true, and {if (lock==0) break;} in line 3 to line 6 indicates a loop body. A value of lock may be repeatedly checked in the loop body to determine whether the thread invoking the spinlock_lock function continues with the loop from line 3 to line 7 or exits the loop to execute code after line 7.

After the busy-wait loop is identified based on the foregoing "always true" or "not always true", in the manner described in the foregoing operation 302, the loop condition may be converted and a loop mark is added. For example, the loop condition while (lock) in line 3 in FIG. 5A is converted to "if (! Locked)_MODELCHECKER_block( )", and the loop condition while (true) in line 3 in FIG. 5B is converted to "if (! Locked)_MODELCHECKER_block( )". When the processor detects an execution flow including "if (! Locked)_MODELCHECKER_block( )", the execution flow may be marked as a potential infinite loop execution flow, so that a corresponding inspection process is executed to determine whether the execution flow is an infinite loop execution flow.

After operation 202 in the embodiment corresponding to FIG. 3 or after operation 303 in the embodiment corresponding to FIG. 4, a plurality of execution flows may be filtered, to filter out a redundant execution flow from the plurality of execution flows. In this way, an inspection range of an execution flow can be reduced, to shorten a time for inspecting source code.

Figure 6:
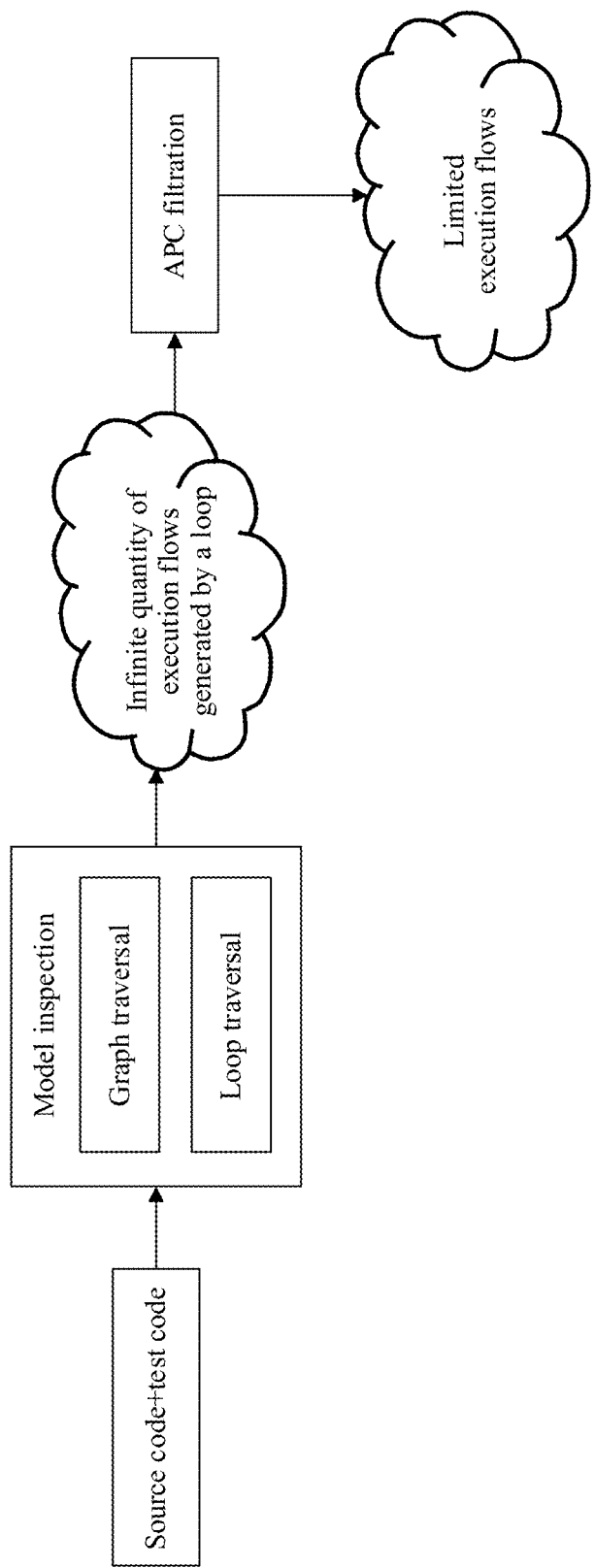
FIG. 6 is a schematic diagram of execution flow filtration according to an embodiment of this application.

A filtering algorithm used in the process of filtering the execution flow may be referred to as an await progress condition (APC) algorithm. In this embodiment of this application, for understanding of a process of filtering an infinite quantity of execution flows generated in a loop to have limited execution flows, refer to FIG. 6. As shown in FIG. 6, after receiving the source code and the test code, a computer device performs model inspection. During the model inspection, a graph traversal and a loop traversal are executed. Executing the graph traversal may traverse all branches in the source code. Executing a loop traversal may traverse loops in all branches. An infinite quantity of execution flows may be generated during the loop traversal. In an embodiment of this application, the APC filtering algorithm is used to perform filtration on the infinite quantity of execution flows to filter out the redundant execution flow from the plurality of execution flows, to obtain limited execution flows. At least two write operations in at least two iterations of a loop in the redundant execution flow correspond to a same write operation.

Figure 7:
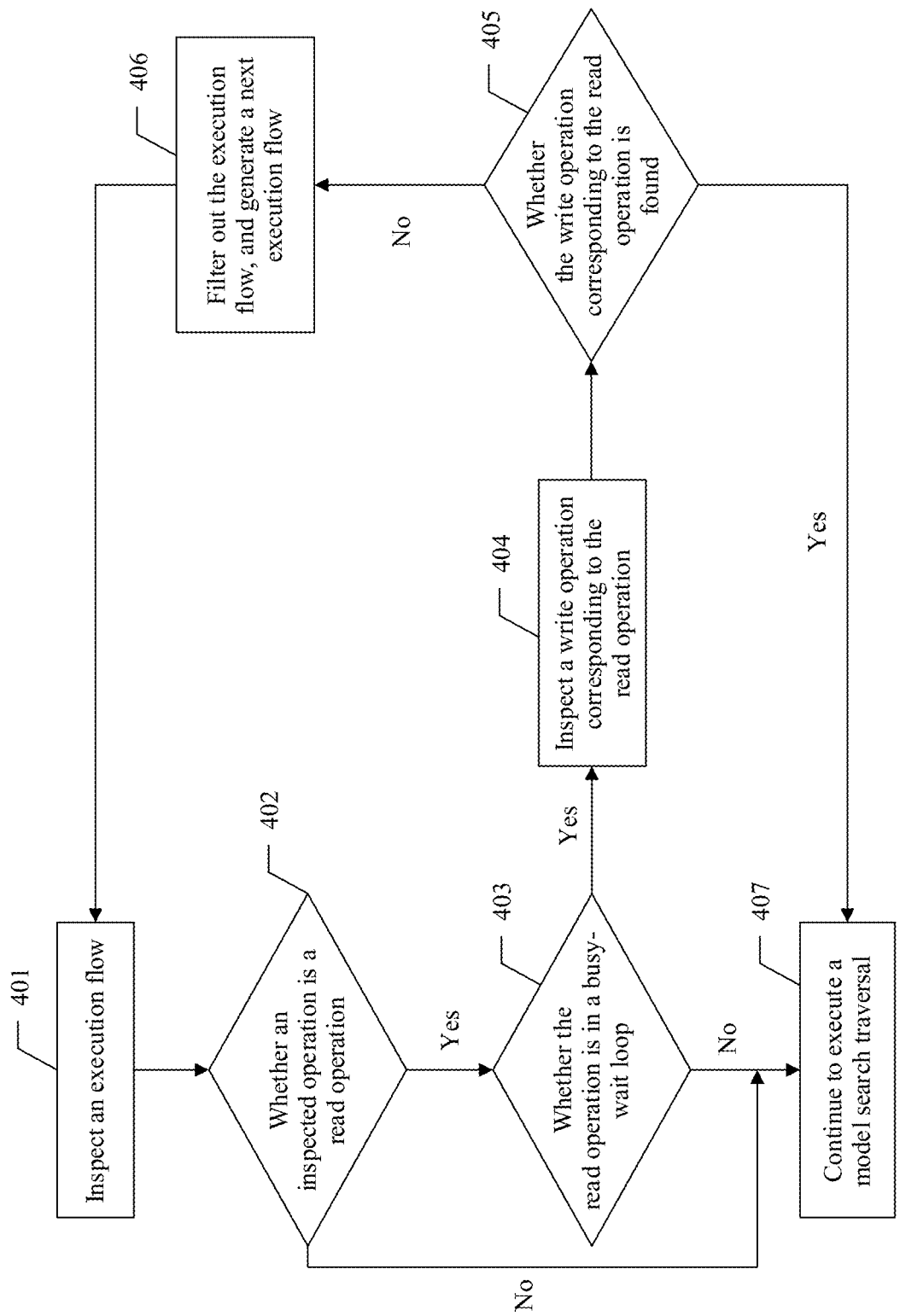
FIG. 7 is a schematic diagram of another embodiment of execution flow filtration according to an embodiment of this application.

For understanding of a specific process in which the foregoing APC filters out the redundant execution flow from the plurality of execution flows, refer to FIG. 7.

As shown in FIG. 7, the filtering process includes the following operations.

Operation 401: Inspect an execution flow.

The execution flow inspected in operation 401 may be any execution flow, and may be referred to as a first execution flow In an embodiment of this application. The inspecting an execution flow may be inspecting a read operation in a current iteration of a loop in the first execution flow. The read operation may be any read operation in the current iteration of the loop, and may be referred to as a first read operation.

The first execution flow is any execution flow in a plurality of execution flows, and the current iteration of a loop is a busy-wait loop that is being executed in the first execution flow.

Operation 402: Determine whether an inspected operation is a read operation.

Operation 402 means determining whether the inspected operation is a read operation or a write operation. If the inspected operation is the read operation, perform operation 403. If not, it indicates that the inspected operation is a write operation rather than a read operation. In this case, perform operation 407.

Operation 403. If the inspected operation is a read operation, determine whether the read operation is in a busy-wait loop. If the read operation is in the busy-wait loop, perform operation 404. If the read operation is not in the busy-wait loop, perform operation 407.

Operation 404. Inspect a write operation corresponding to the read operation.

To be specific, if a current thread that executes the first read operation is executing the busy-wait loop in the first execution flow, inspect a write operation corresponding to the first read operation.

Operation 405. Determine whether the write operation corresponding to the read operation is found. If the write operation corresponding to the read operation is found, perform operation 407. If the write operation corresponding to the read operation is not found, perform operation 406.

Operation 406. If a write operation referenced by the current thread that executes the read operation has been referenced by the current thread when previously executing a read operation in a loop, determine the execution flow as a redundant execution flow, filter out the execution flow, generate a next execution flow, and repeat the foregoing process.

Operation 407. Continue to execute a model search traversal.

If the inspected operation is determined as the write operation in operation 402, or if the write operation corresponding to the read operation is not found in operation 405, continue to execute the model search traversal.

To be specific, if the write operation referenced by the current thread that executes the read operation has been referenced by the current thread of the first read operation when previously executing a second read operation in a loop, it is determined that the first execution flow is a redundant execution flow, and filter out the first execution flow.

In a process of model inspection by using the foregoing APC algorithm, it is ensured that each read operation in a busy-wait condition obtains a value instead of an old value from a new write operation. In this way, a meaningless read traversal may be deleted, to ensure that a value read in a loop condition of each iteration of busy-wait loop is a new value.

In this embodiment of this application, a process of determining the redundant execution flow may be performed by inspecting whether the read operation has a corresponding unreferenced write operation. If one write operation is referenced twice by two write operations executed by a thread that does not belong to a same iteration of a busy-wait loop, it indicates that the executed first execution flow is a redundant execution flow, and the first execution flow needs to be filtered out. This solution of filtering out an execution flow can accelerate reduction of an inspection range of an execution flow.

Figure 8A:
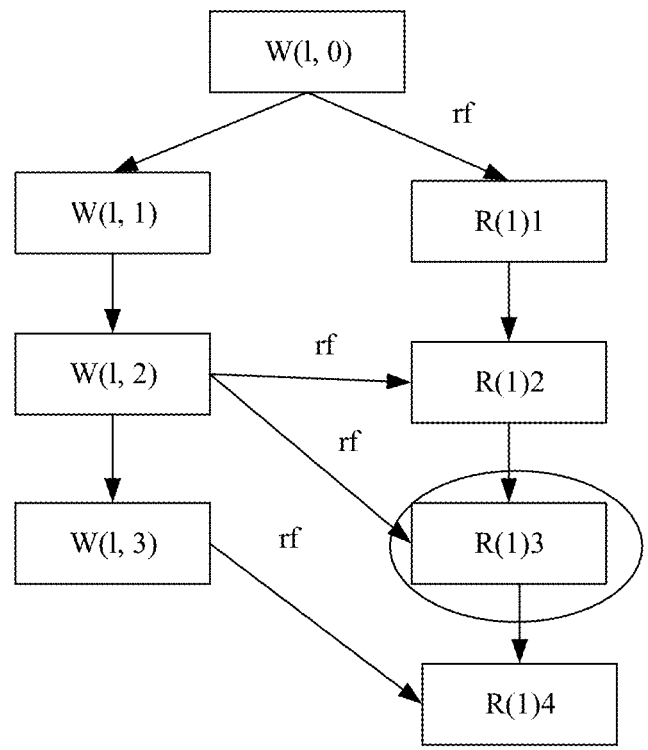
FIG. 8A is a schematic diagram of an example according to an embodiment of this application.
Figure 8B:
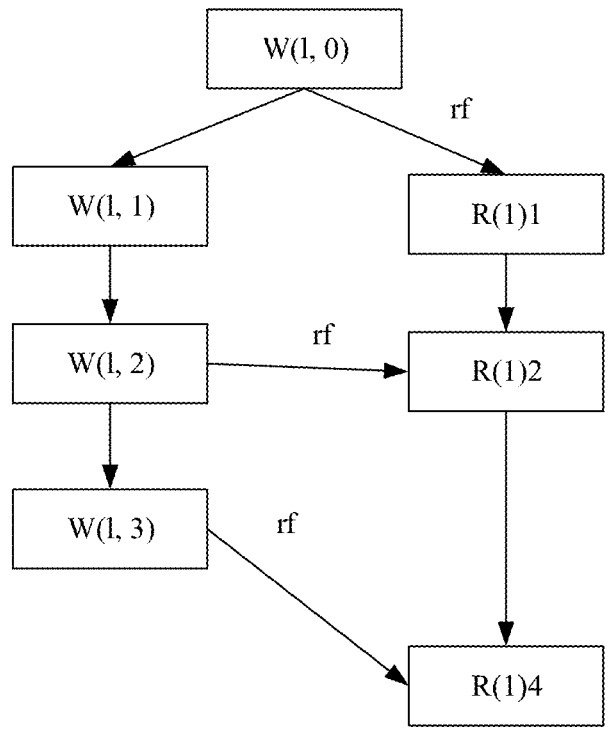
FIG. 8B is a schematic diagram of an example according to an embodiment of this application.

In specific application, for understanding of whether an execution flow generated by using an APC filtering algorithm is used, refer to a comparison between a schematic diagram in which APC filtration is not used as shown in FIG. 8A and a schematic diagram in which APC filtration is used as shown in FIG. 8B.

As shown in FIG. 8A, for a loop condition of await_while (l<3), the loop is exited when l=3. Therefore, a plurality of execution flows shown in FIG. 8A may be generated under the loop condition. In FIG. 8A, W(l, 0) indicates an initial write operation when l=0. W(l, 1) indicates a write operation when l=1. W(l, 2) indicates a write operation when l=2. W(l, 3) indicates a write operation when l=3. And rf in FIG. 8A indicates a reference relationship between a read operation and a write operation. The reference relationship in FIG. 8A includes that a read operation R(l)1 references W(l, 0), a read operation R(l)2 references W(l, 2), a read operation R(l)3 references W(l, 2), and a read operation R(l)4 references W(l, 3), where W(l, 2) is referenced by two read operations R(l)2 and R(l)3, and R(l)3 is W(l, 2) referenced by R(l)2. Therefore, an execution flow including R(l)3 is used as an execution flow. If filtration is performed based on the APC filtering algorithm provided in an embodiment of this application, a schematic diagram as shown in FIG. 8B may be obtained. It can be learned from a comparison between FIG. 8A and FIG. 8B that the redundant execution flow is filtered out by using the APC, to reduce a range of performing execution flow inspection, and efficiency of correctness inspection of source code can be improved.

In an embodiment, the foregoing operation 203 or operation 304 provided in an embodiment of this application may include: when the plurality of threads are invoked to execute the busy-wait loop in the target execution flow, setting a state mark for each read operation in a state set; when one write operation is generated in the busy-wait loop, deleting one state mark from the state set; and when the write operation is no longer generated in the busy-wait loop, if the state set still includes the state mark, determining the busy-wait loop in the target execution flow as the infinite loop.

Figure 9:
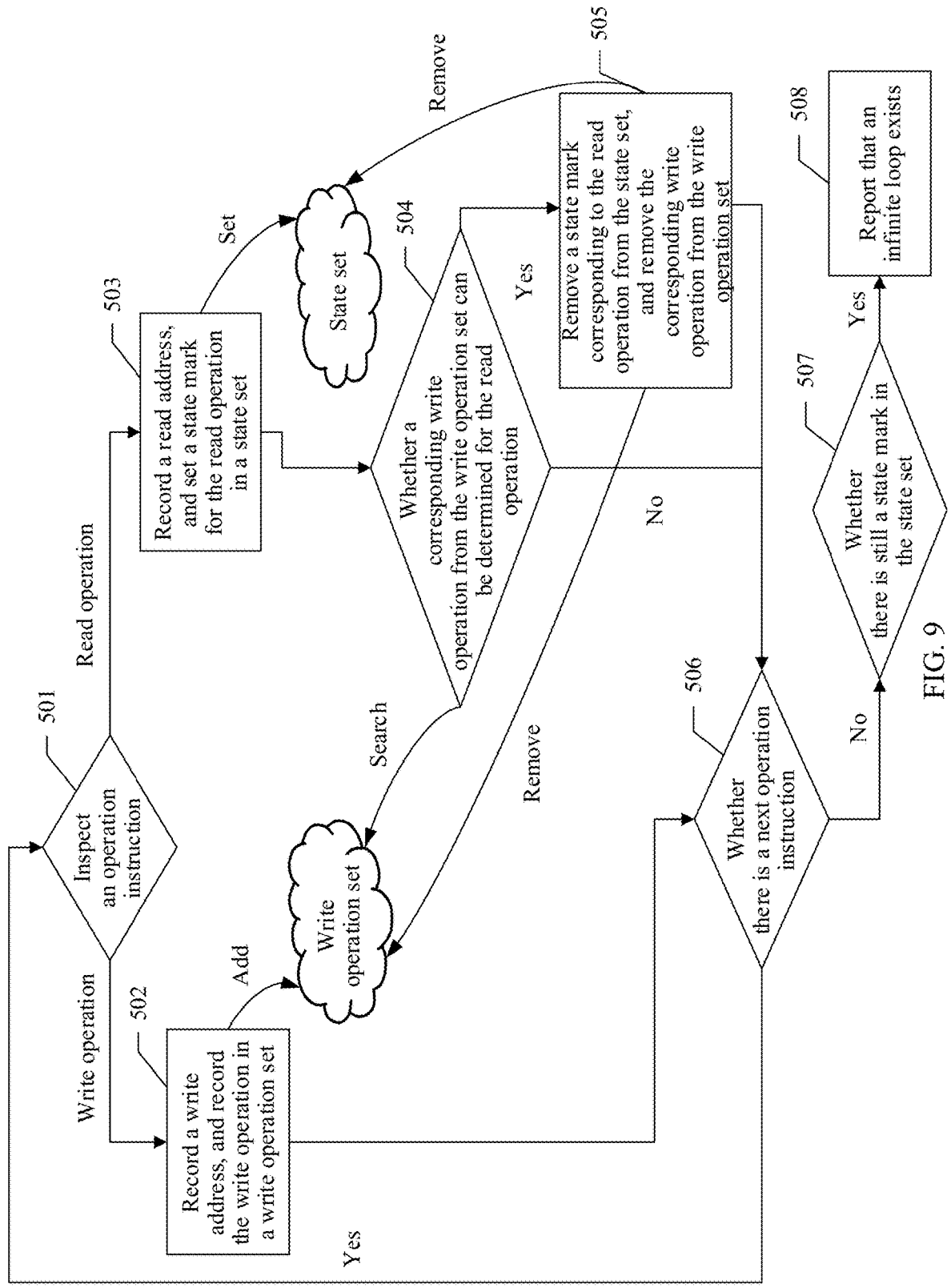
FIG. 9 is an embodiment of an execution flow inspection according to an embodiment of this application.

In this embodiment of this application, for understanding of a process of inspecting the target execution flow, refer to FIG. 9. As shown in FIG. 9, the process of inspecting the target execution flow may include the following operations.

Operation 501: Inspect an operation instruction. If the operation instruction is a write operation, perform operation 502. If the operation instruction is a read operation, perform operation 503.

The operation instruction is an operation instruction that is performed on a shared memory by invoking the target execution flow by a thread.

Operation 502: If the operation instruction is a write operation, record the write address, record the write operation in a write operation set, and continue to perform operation 506.

In this operation, one write operation is added to the write operation set.

Operation 503: If the operation instruction is a read operation, record a read address, and set a state mark for the read operation in a state set.

The state set is used to store the state mark, and each state mark indicates a new read operation.

Operation 504: Inspect whether a corresponding write operation from the write operation set can be determined for the read operation. If the corresponding write operation can be determined, perform operation 505. If the corresponding write operation cannot be performed, perform operation 506.

Operation 505: If the corresponding write operation is determined for the read operation, remove a state mark corresponding to the read operation from the state set, and remove the corresponding write operation from the write operation set. Then, perform operation 506. Operation 506: Inspect whether there is a next operation instruction. If there is a next operation instruction, repeat operation 501. If there is no next operation instruction, perform operation 507.

Operation 507: Inspect whether there is still a state mark in the state set. If there is still a state mark in the state set, perform operation 508.

Operation 508: If there is still a state mark in the state set, report that an infinite loop exists.

In this embodiment of this application, whether each newly generated read operation has a newly generated write operation may be determined by using a state mark. If there is a surplus state mark in the state set, it indicates that the newly generated read operation has no corresponding newly generated write operation, and it indicates that the busy-wait loop cannot exit, and the busy-wait loop is an infinite loop. This implementation helps quickly determine whether a busy-wait loop can be terminated. If the busy-wait loop cannot be terminated, it indicates that an error exists in the first source code.

The foregoing describes the code inspection method under the weak memory ordering architecture. The following describes, with reference to the accompanying drawings, a code inspection apparatus 60 under the weak memory ordering architecture provided in an embodiment of this application.

Figure 10:
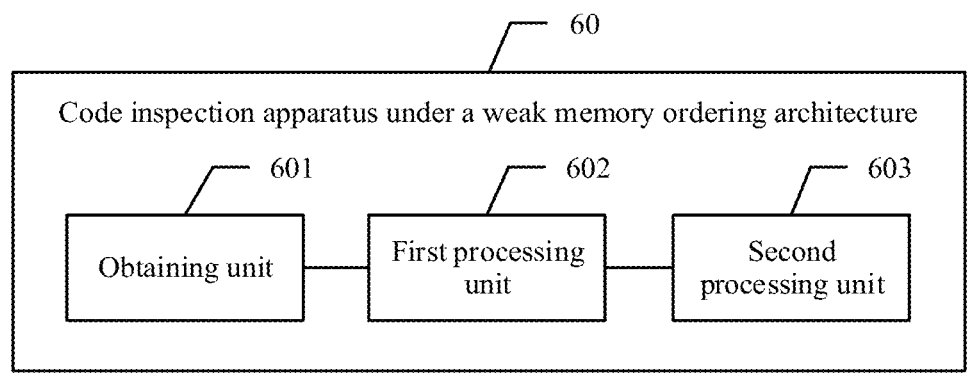
FIG. 10 is a schematic diagram of an embodiment of a code inspection apparatus under a weak memory ordering architecture according to an embodiment of this application.

As shown in FIG. 10, an embodiment of the code inspection apparatus 60 under the weak memory ordering architecture provided in an embodiment of this application includes an obtaining unit 601, a first processing unit 602, and a second processing unit 603.

The obtaining unit 601 is configured to obtain first source code and test code, where the first source code includes a blocking mark, the test code indicates a condition that needs to be met for correctly running of the first source code, the first source code corresponds to a plurality of threads, the plurality of threads have at least one shared memory, and the blocking mark indicates a location of a busy-wait loop in the first source code. The obtaining unit 601 may perform operation 201 or operation 301 in the foregoing method embodiment.

The first processing unit 602 is configured to generate, based on the condition indicated by the test code obtained by the obtaining unit 601 and the first source code, a plurality of execution flows under the weak memory ordering architecture for the plurality of threads that operate a same shared memory, where each execution flow is a code execution process in which a processor runs the plurality of threads to perform a read operation and/or write operation on the same shared memory, and a busy-wait loop exists in a target execution flow that includes the blocking mark and that is in the plurality of execution flows. The first processing unit 602 may perform operation 202 or operation 303 in the foregoing method embodiment.

The second processing unit 603 is configured to determine the busy-wait loop in the target execution flow as an infinite loop if a read operation executed by a target thread in one iteration of the busy-wait loop cannot reference an unreferenced write operation when the plurality of threads are invoked to execute the busy-wait loop in the target execution flow generated by the first processing unit 602, where the infinite loop indicates that an error exists in the first source code, and the target thread is any one of the plurality of threads. The second processing unit 603 may perform operation 203 or operation 304 in the foregoing method embodiment.

According to the solution provided in this embodiment of this application, because the target execution flow may be inspected by using the blocking mark, even if the first source code may generate an infinite quantity of execution flows, there is no need to inspect all the execution flows. Therefore, correctness inspection of the first source code can be completed within a limited time.

In an embodiment, the obtaining unit 601 is configured to: obtain second source code; and identify, from the second source code, a code block that indicates the busy-wait loop, and add the blocking mark to the code block that indicates the busy-wait loop, to obtain the first source code. The obtaining unit 601 may perform operation 302 in the foregoing method embodiment.

In an embodiment, the first processing unit 602 is further configured to: convert, from a first form to a second form, a symbol indicating a loop condition in the code block that indicates the busy-wait loop; and add the blocking mark to a location associated with a symbol of a loop condition in the second form.

In an embodiment, the first processing unit 602 is configured to: identify a loop condition from the second source code, where the loop condition includes always true or not always true; and if the loop condition is not always true, determine, based on a value corresponding to the loop condition, that a code block associated with the loop condition is the code block of the busy-wait loop; or if the loop condition is always true, determine, based on a loop body associated with the loop condition, that a code block associated with the loop condition is the code block of the busy-wait loop.

In an embodiment, the first processing unit 602 is further configured to filter out a redundant execution flow from the plurality of execution flows, where at least two write operations in at least two iterations of a loop in the redundant execution flow correspond to a same write operation.

In an embodiment, the first processing unit 602 is configured to: inspect a first read operation in a current iteration of a loop in a first execution flow, where the first execution flow is any execution flow in the plurality of execution flows, and the current iteration of the loop is one iteration, being executed in the first execution flow, of the busy-wait loop; if a current thread that executes the first read operation is executing a busy-wait loop in the first execution flow, inspect a write operation corresponding to the first read operation; if a write operation referenced by the current thread that executes the first read operation has been referenced by the current thread when previously executing a second read operation in a loop, determine that the first execution flow is the redundant execution flow; and filter out the first execution flow.

In an embodiment, the second processing unit 603 is configured to: when the plurality of threads are invoked to execute the busy-wait loop in the target execution flow, set a state mark for each read operation in a state set; when one write operation is generated in the busy-wait loop, delete one state mark from the state set; and when the write operation is no longer generated in the busy-wait loop, if the state set still includes the state mark, determine the busy-wait loop in the target execution flow as the infinite loop.

In this embodiment of this application, the obtaining unit 601 may correspond to the foregoing (source code+test code) obtaining module in FIG. 2, the first processing unit 602 and the second processing unit 603 may correspond to the foregoing model inspection module in FIG. 2, and the obtaining unit 601 may further correspond to the foregoing preprocessing module in FIG. 2.

The apparatus 60 described above may be understood with reference to corresponding content in the foregoing method embodiments, and details are not described herein again.

Figure 11:
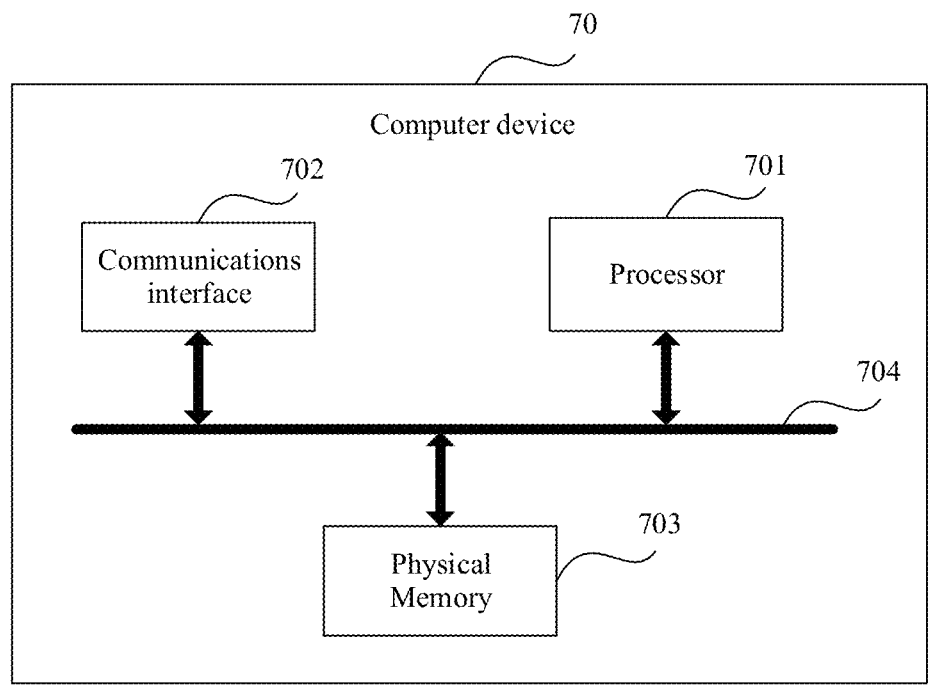
FIG. 11 is a schematic diagram of a structure of a computer device according to an embodiment of this application.

FIG. 11 is a schematic diagram of a possible logical structure of a computer device 70 according to an embodiment of this application. The computer device 70 includes a processor 701, a communications interface 702, a physical memory 703, and a bus 704. The processor 701, the communications interface 702, and the physical memory 703 are connected to each other through the bus 704. In this embodiment of this application, the processor 701 is configured to control and manage an action of the computer device 70. For example, the processor 701 is configured to execute the operations in the method embodiments in FIG. 2 to FIG. 8B. The communications interface 702 is configured to support the computer device 70 to perform communication. The physical memory 703 is configured to store program code and data of the computer device 70, and provide memory space for the process group.

The processor 701 may be a central processing unit, a general-purpose processor, a digital signal processor, an application-specific integrated circuit, a field programmable gate array or another programmable logic device, a transistor logic device, a hardware component, or any combination thereof. The processor 701 may implement or execute various example logical blocks, modules, and circuits described with reference to content disclosed In an embodiment of this application. The processor 701 may also be a combination of processors implementing a computing function, for example, a combination of one or more microprocessors, a combination of a digital signal processor and a microprocessor, and the like. The bus 704 may be a peripheral component interconnect (PCI) bus, an extended industry standard architecture (EISA) bus, or the like. Buses may be classified into an address bus, a data bus, a control bus, and the like. For ease of representation, only one bold line is used to represent the bus in FIG. 11, but this does not mean that there is only one bus or only one type of bus.

In another embodiment of this application, a computer-readable storage medium is further provided. The computer-readable storage medium stores computer-executable instructions. When a processor of a device executes the computer-executable instructions, the device executes the operations executed by the processor in FIG. 2 to FIG. 8B.

In another embodiment of this application, a computer program product is further provided. The computer program product includes computer-executable instructions, and the computer-executable instructions are stored in a computer-readable storage medium. When a processor of a device executes the computer-executable instructions, the device executes the operations executed by the processor in FIG. 2 to FIG. 8B.

In another embodiment of this application, a chip system is further provided. The chip system includes a processor, and the processor is configured to support a memory management apparatus to implement the operations executed by the processor in FIG. 2 to FIG. 8B. In a possible design, the chip system may further include a memory. The memory is configured to store program instructions and data that are necessary for a data writing apparatus. The chip system may include a chip, or may include a chip and another discrete component.

A person of ordinary skill in the art may be aware that, in combination with the examples described in embodiments disclosed in this specification, units and algorithm operations may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it shall not be considered that the implementation goes beyond the scope of embodiments of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in embodiments of this application, it should be understood that the disclosed system, apparatuses, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate. Parts displayed as units may or may not be physical units, to be specific, may be located in one location, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of embodiments of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are only specific implementations of embodiments of this application, but are not intended to limit the protection scope of embodiments of this application.

What is claimed is:

1. A code inspection method under a weak memory ordering architecture, comprising:
obtaining a first source code and a test code, wherein the first source code comprises a blocking mark, the test code indicates a condition that needs to be met for correct running of the first source code, the first source code corresponds to a plurality of threads, the plurality of threads have at least one shared memory, and the blocking mark indicates a location of a busy-wait loop in the first source code;
generating, based on the first source code and the condition indicated by the test code, a plurality of execution flows under the weak memory ordering architecture for the plurality of threads that operate a same shared memory, wherein each execution flow is a code execution process in which a processor runs the plurality of threads to perform a read operation and/or write operation on the same shared memory, and a busy-wait loop exists in a target execution flow that comprises the blocking mark and that is in the plurality of execution flows; and
determining the busy-wait loop in the target execution flow as an infinite loop if a read operation executed by a target thread in one iteration of the busy-wait loop cannot reference an unreferenced write operation when the plurality of threads are invoked to execute the busy-wait loop in the target execution flow, wherein the infinite loop indicates that an error exists in the first source code, and the target thread is any one of the plurality of threads.

2. The method according to claim 1, wherein the obtaining the first source code comprises:
obtaining a second source code; and
identifying, from the second source code, a code block that indicates the busy-wait loop, and adding the blocking mark to the code block that indicates the busy-wait loop, to obtain the first source code.

3. The method according to claim 2, further comprising:
converting, from a first form to a second form, a symbol indicating a loop condition in the code block that indicates the busy-wait loop; and
the adding the blocking mark to the code block that indicates the busy-wait loop comprises:
adding the blocking mark to a location associated with the symbol of the loop condition in the second form.

4. The method according to claim 2, wherein the identifying, from the second source code, a code block that indicates the busy-wait loop comprises:
identifying a loop condition from the second source code, wherein the loop condition comprises always true or not always true; and
if the loop condition is not always true, determining, based on a value corresponding to the loop condition, that a code block associated with the loop condition is the code block of the busy-wait loop; or
if the loop condition is always true, determining, based on a loop body associated with the loop condition, that a code block associated with the loop condition is the code block of the busy-wait loop.

5. The method according to claim 1, further comprising:
filtering out a redundant execution flow from the plurality of execution flows, wherein at least two write operations in at least two iterations of a loop in the redundant execution flow correspond to a same write operation.

6. The method according to claim 5, wherein the filtering out a redundant execution flow from the plurality of execution flows comprises:
inspecting a first read operation in a current iteration of a loop in a first execution flow, wherein the first execution flow is any execution flow in the plurality of execution flows, and the current iteration of the loop is one iteration, being executed in the first execution flow, of the busy-wait loop;
if a current thread that executes the first read operation is executing a busy-wait loop in the first execution flow, inspecting a write operation corresponding to the first read operation;
if a write operation referenced by the current thread that executes the first read operation has been referenced by the current thread when previously executing a second read operation in a loop, determining that the first execution flow is the redundant execution flow; and
filtering out the first execution flow.

7. The method according to claim 1, wherein the determining the busy-wait loop in the target execution flow as an infinite loop if a read operation executed by a target thread in one iteration of the busy-wait loop cannot reference an unreferenced write operation when the plurality of threads are invoked to execute the busy-wait loop in the target execution flow comprises:
when the plurality of threads are invoked to execute the busy-wait loop in the target execution flow, setting a state mark for each read operation in a state set;
when one write operation is generated in the busy-wait loop, deleting one state mark from the state set; and
when the write operation is no longer generated in the busy-wait loop, if the state set still comprises the state mark, determining the busy-wait loop in the target execution flow as the infinite loop.

8. A non-transitory computer-readable storage medium, wherein the computer-readable storage medium stores a computer program, and when the computer program is executed by a processor, the processor is invoked to perform operations according to claim 1.

9. A chip system, comprising a processor, wherein the processor is invoked to perform operations according to claim 1.

10. A computer device, comprising a processor, a memory, and a computer-readable storage medium storing a computer program, wherein the processor is coupled to the computer-readable storage medium, and when the computer program is executed by the processor, the processor is caused to perform operations:
obtaining a first source code and a test code, wherein the first source code comprises a blocking mark, the test code indicates a condition that needs to be met for correct running of the first source code, the first source code corresponds to a plurality of threads, the plurality of threads have at least one shared memory, and the blocking mark indicates a location of a busy-wait loop in the first source code;
generating, based on the first source code and the condition indicated by the test code, a plurality of execution flows under a weak memory ordering architecture for the plurality of threads that operate a same shared memory, wherein each execution flow is a code execution process in which a processor runs the plurality of threads to perform a read operation and/or write operation on the same shared memory, and a busy-wait loop exists in a target execution flow that comprises the blocking mark and that is in the plurality of execution flows; and determining the busy-wait loop in the target execution flow as an infinite loop if a read operation executed by a target thread in one iteration of the busy-wait loop cannot reference an unreferenced write operation when the plurality of threads are invoked to execute the busy-wait loop in the target execution flow, wherein the infinite loop indicates that an error exists in the first source code, and the target thread is any one of the plurality of threads.

11. The computer device according to claim 10, wherein the processor is configured to:

obtain a second source code; and identify, from the second source code, a code block that indicates the busy-wait loop, and add the blocking mark to the code block that indicates the busy-wait loop, to obtain the first source code.

12. The computer device according to claim 11, wherein the processor is further configured to:

convert, from a first form to a second form, a symbol indicating a loop condition in the code block that indicates the busy-wait loop; and add the blocking mark to a location associated with the symbol of the loop condition in the second form.

13. The computer device according to claim 11, wherein the processor is configured to:

identify a loop condition from the second source code, wherein the loop condition comprises always true or not always true; and if the loop condition is not always true, determine, based on a value corresponding to the loop condition, that a code block associated with the loop condition is the code block of the busy-wait loop; or if the loop condition is always true, determine, based on a loop body associated with the loop condition, that a code block associated with the loop condition is the code block of the busy-wait loop.

14. The computer device according to claim 10, wherein the processor is further configured to:

filter out a redundant execution flow from the plurality of execution flows, wherein at least two write operations in at least two iterations of a loop in the redundant execution flow correspond to a same write operation.

15. The computer device according to claim 14, wherein the processor is configured to:

inspect a first read operation in a current iteration of a loop in a first execution flow, wherein the first execution flow is any execution flow in the plurality of execution flows, and the current iteration of the loop is one iteration, being executed in the first execution flow, of the busy-wait loop;

if a current thread that executes the first read operation is executing a busy-wait loop in the first execution flow, inspect a write operation corresponding to the first read operation;

if a write operation referenced by the current thread that executes the first read operation has been referenced by the current thread when previously executing a second read operation in a loop, determine that the first execution flow is the redundant execution flow; and filter out the first execution flow.

16. The computer device according to claim 10, wherein the processor is configured to:

when the plurality of threads are invoked to execute the busy-wait loop in the target execution flow, set a state mark for each read operation in a state set;

when one write operation is generated in the busy-wait loop, delete one state mark from the state set; and when the write operation is no longer generated in the busy-wait loop, if the state set still comprises the state mark, determine the busy-wait loop in the target execution flow as the infinite loop.

* * * * *